Jan. 22, 1957 J. W. WILCOX 2,778,086
APPARATUS FOR SCORING COLUMN FROM WHICH BRICKS ARE MADE
Filed Feb. 20, 1953 4 Sheets-Sheet 1

INVENTOR
James W. Wilcox
BY
ATTORNEY

Jan. 22, 1957 J. W. WILCOX 2,778,086
APPARATUS FOR SCORING COLUMN FROM WHICH BRICKS ARE MADE
Filed Feb. 20, 1953 4 Sheets-Sheet 3

INVENTOR
James W. Wilcox

BY
ATTORNEY

Jan. 22, 1957 J. W. WILCOX 2,778,086
APPARATUS FOR SCORING COLUMN FROM WHICH BRICKS ARE MADE
Filed Feb. 20, 1953 4 Sheets-Sheet 4
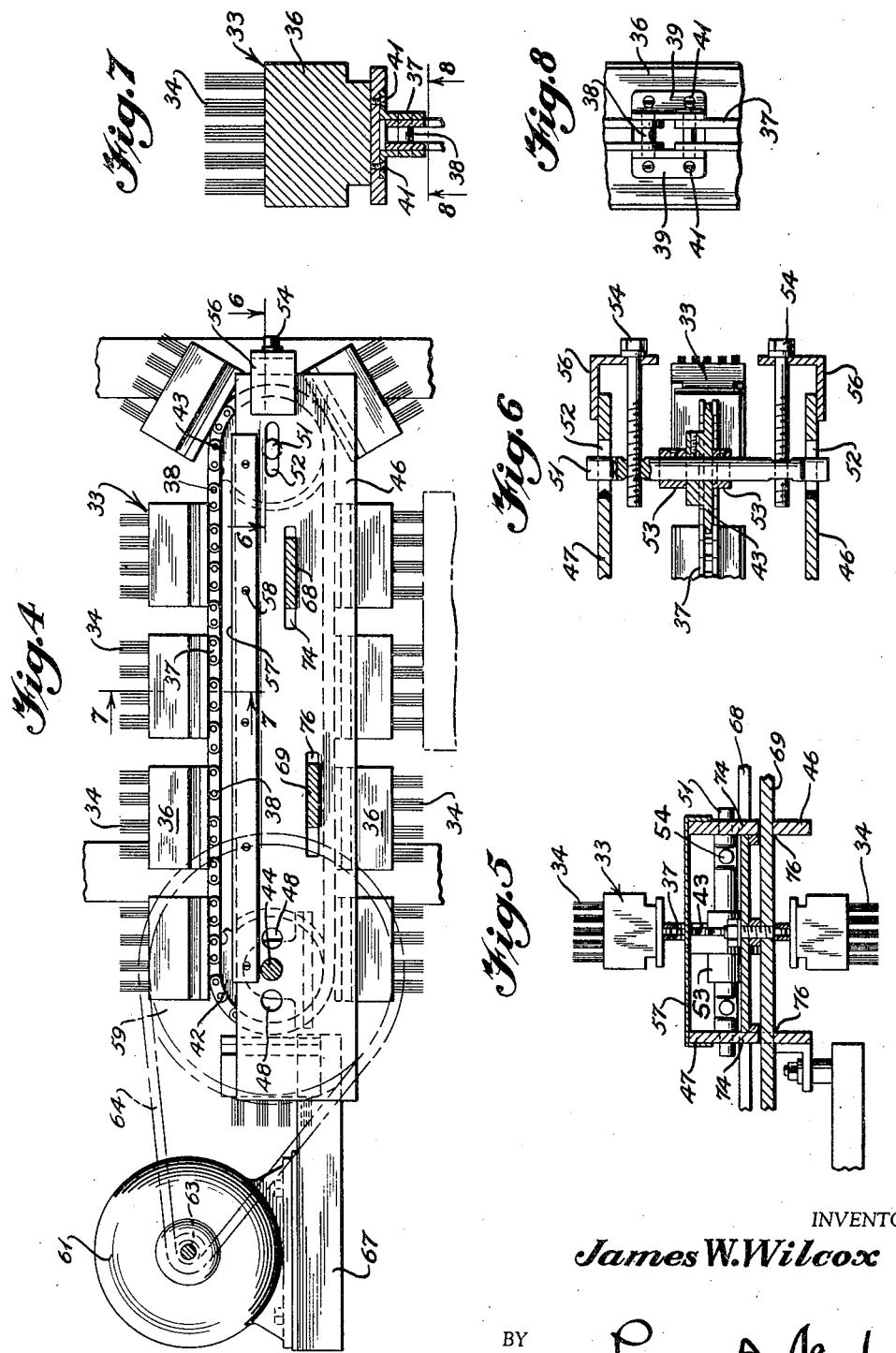
INVENTOR
James W. Wilcox
BY
ATTORNEY

United States Patent Office 2,778,086
Patented Jan. 22, 1957

2,778,086

APPARATUS FOR SCORING COLUMN FROM WHICH BRICKS ARE MADE

James W. Wilcox, Alliance, Ohio, assignor to The Alliance Clay Product Company, Alliance, Ohio, a corporation of Ohio Application February 20, 1953, Serial No. 337,927

4 Claims. (Cl. 25—1)

The present invention relates to apparatus for applying a textural finish to one face and two side edges of a clay or similar column immediately after it issues from the extrusion die of a brick making machine and imparting such textural finish to the column while it is moving away from the die.

An object of the invention is to score the column from which bricks are made in such a manner that bricks formed therefrom of a substantially standard size have generally horizontal lines on the face thereof whereby a wall formed of such bricks has predominantly horizontal lines which provide the illusion that the bricks are of greater horizontal dimensions than standard bricks and thereby emphasizing the horizontal lines of the wall of a building.

Another object of the invention is to provide apparatus which will provide score lines in the column being extruded from the forming die of a brick making machine so that the textural lines are arranged substantially at right angles to the direction of movement of the column including means for adjusting the angular position of the scoring mechanism to thereby accommodate changes in speed at which the plastic material is extruded from the die structure.

A still further object of the invention is to provide a plurality of brushes carrying bristles with the brushes arranged in an end-to-end relationship and movable in an endless path generally transversely of the direction of movement of the column of plastic material in such a manner that the free ends of the bristles engage a surface of the plastic column and form score lines therein without removing substantial portions of the plastic material with the brushes so mounted and carried that they may be replaced with brushes having different types of bristles.

Other objects and features of the invention will be appreciated and become apparent as the present disclosure proceeds and upon consideration of the accompanying drawings and the following detailed description wherein an embodiment of the invention is disclosed.

In the drawings:

Fig. 4 is a side elevation on a larger scale of the mechanism for applying a textural finish to the upper surface of the column with parts shown in section.

Fig. 5 is a sectional view taken on the line 5—5 of Fig. 1.

Fig. 6 is a sectional view taken on the line 6—6 of Fig. 4.

Fig. 7 is a sectional view of one of the brushes showing the mounting thereof and taken on the line 7—7 of Fig. 4.

Fig. 8 is an inverted plan view of a portion of the chain illustrating the manner in which each brush is connected thereto and taken on the line 8—8 of Fig. 7.

Fig. 9 is a fragmentary sectional view taken on the line 9—9 of Fig. 1.

Figure 1:
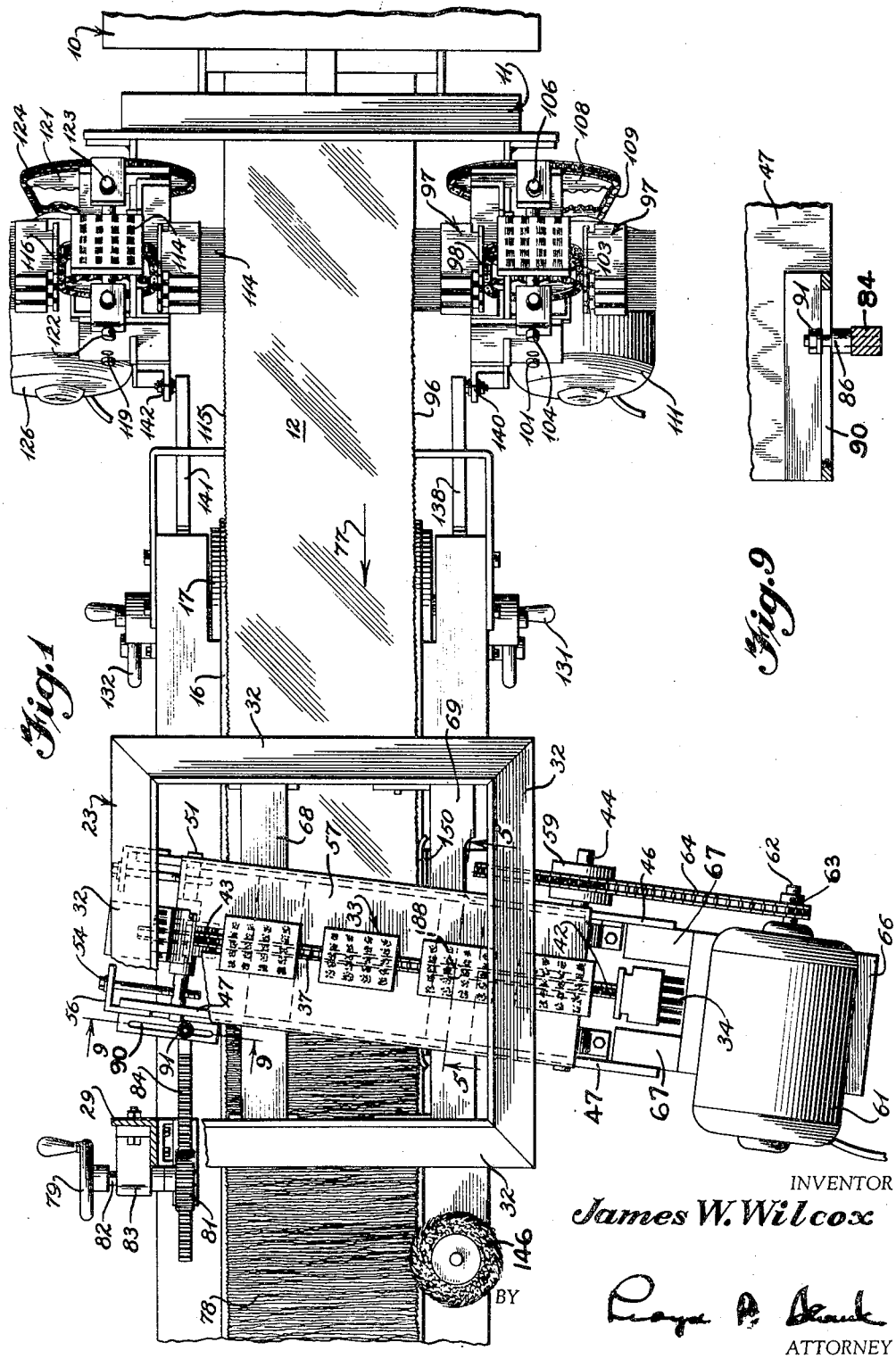
Fig. 1 is a plan view of apparatus embodying the invention.

The invention is directed to apparatus for applying score lines which extend longitudinally of the face and header ends of each brick which are in general of a nonuniform pattern to emphasize the horizontal lines of a wall without imparting a textural finish which is in detail repeated on each brick. The textural finish is applied to the clay or shale column immediately after it issues from the extrusion die of a brick making machine. The score lines of irregular shape are desirable such as to provide horizontal lines on the face and header ends of a brick to create an appearance that the bricks are longer and of less height or thickness than other bricks of the same dimensions. The horizontal scoring is attained by means of brushes which move transversely over the column and substantially at right angles thereto and similar brushes move vertically along the sides of the column to score the portions which form the header ends of the brick. The textural lines are formed by the brushes carried in endless paths and operate equally well on de-aired or non de-aired extruded clay or shale columns from which the bricks are made. The apparatus requires no changes in the extrusion dies and the brushes remove very little material from the column and thereby do not materially alter the size of the finished bricks. The brushing strokes are such that no two bricks have exactly the same textural finish thus making it possible for a finished wall to be relieved of monotony. Changes may be made in the textural scoring assembly by changing the type and size and number of bristles or wires carried by the brushes.

Referring to the drawings there is shown at 10 a portion of a brick machine in which the clay or shale is mixed and kneaded prior to its issuance from the extrusion die 11. A column 12 of rectangular cross section issues from the die 11. The column 12 is supported as it leaves the die by any suitable means such as a relatively thin plate 14 supported in any suitable manner below the discharge opening in the die 11. The column 12 beyond the plate 14 is supported by a conveyor belt 16 trained about a pair of relatively large pulleys 17 and 18. The upper course of the belt 16 is prevented from sagging between the pulleys 17 and 18 by a plate 15. The conveyor belt is driven in any suitable manner and at a speed equal to that of which the plastic material escapes from the die 11. The conveyor mechanism supported by means of posts one of which is shown at 19 in Fig. 2 and side portions of the conveyor structure are provided with cover plates 21 and 22. The features thus far described are conventional and may vary in form and represent merely one type of equipment that may be used for handling the column as it issues from the die. Such structural elements serve as convenient means for supporting apparatus exhibiting the invention for imparting the unique textural finish to the top surface and the side edges of the column and which form the face and header ends of the bricks cut from the column.

Figure 2:
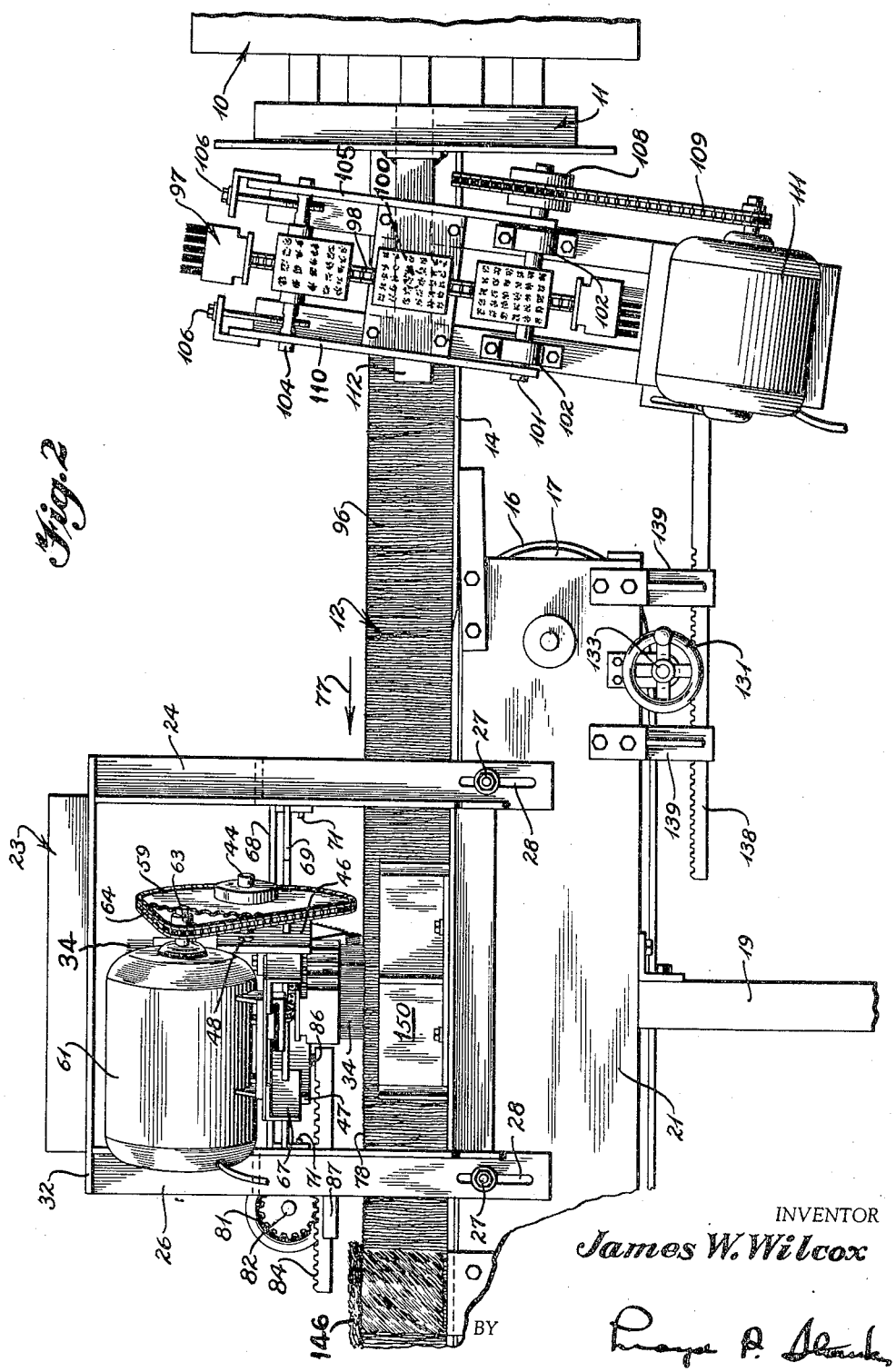
Fig. 2 is a side elevational view.
Figure 3:
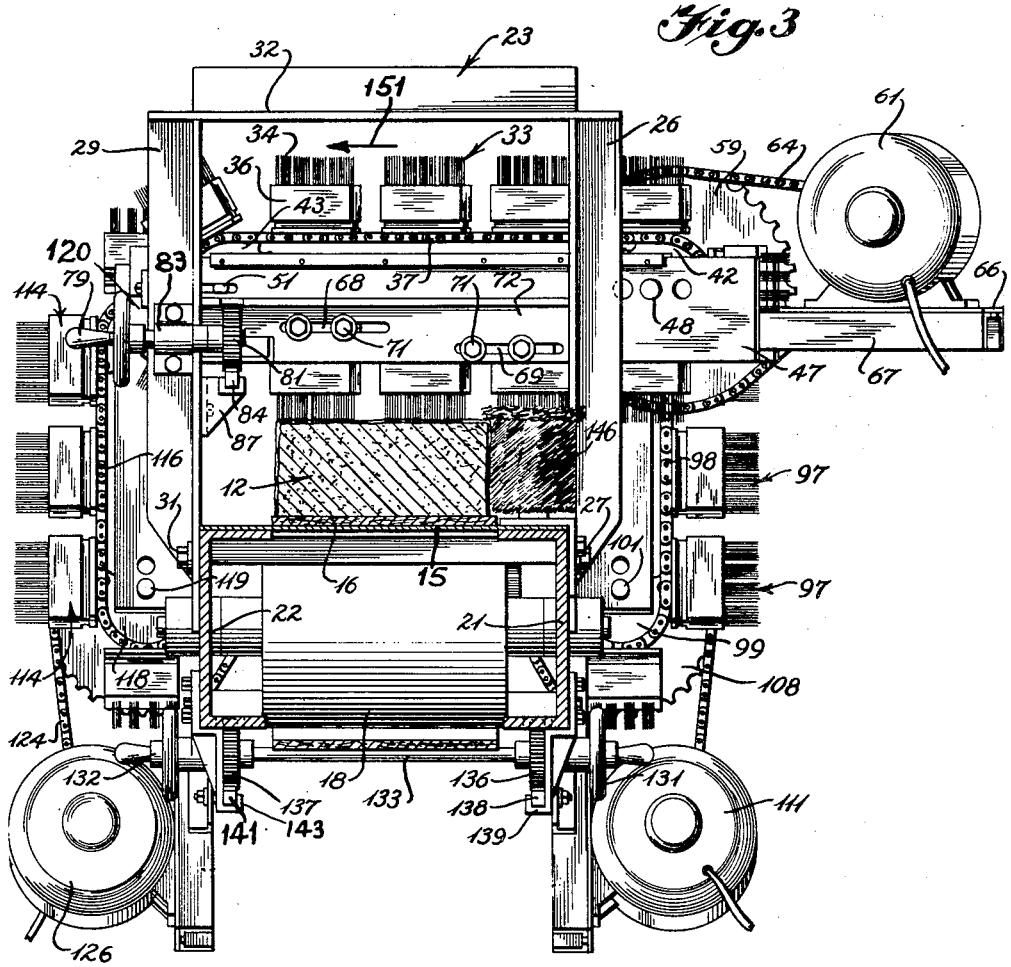
Fig. 3 is an end elevational view of the apparatus showing the column and portions of the conveyor mechanism in section.

The mechanism for scoring the upper face of the column 12 includes a plurality of brushes guided and moved in endless path so that the free ends of the bristles of the brushes engage the top surface of the column 12 and move transversely thereacross to score this surface of the plastic material as it moves away from the extrusion die 11. In the embodiment illustrated the brushes and means for moving and guiding such scoring implements in the desired manner are supported above the column 12 by means of a frame 23 which includes upright members at each side of the conveyor. The upright members 24 and 26 are attached to the side plate 21 as shown in Fig. 2 by means of a bolt and nut assemblies 27. The bolts extend through slots 28 in these upright members so that the position of the frame 23 may be adjusted vertically with respect to the conveyor structure and thereby provide for the adjustment of the position of the scoring mechanism in relation to the height of the column 12. The other side of the frame 23 is supported by two additional upright members one of which is shown at 29 in Fig. 3. These standards are secured to the side plate 22 by means of bolt and nut assemblies 31 and the bolts extend through slots in the upright member so that the position of the entire frame 23 may be adjusted in relation to the top surface of the column 12. The upright members are connected at the top of the frame 23 by means of horizontal angle bars 32 as shown in Fig. 1.

The brushes for scoring the top surface of the column are shown at 33. Each brush has a plurality of bristles 34 which are properly anchored in a block shaped base 36 (Fig. 7). The brushes 33 are detachably secured to a flexible endless band which in the embodiment illustrated is in the form of a sprocket chain 37. The links of the sprocket chain are pivotally connected to each other by means of pins or rivets 38. The base block 36 of each brush may be secured to the chain 37 at spaced intervals therealong by means of angle brackets 39 through which screws 41 extend into the base 36 of the brush as shown in Fig. 8. The flanges of the angle brackets 39 are so designed as to receive the pins 38 for connecting the links of the chain 37 to each other.

The chain 37 is trained about sprocket wheels 42 and 43. The sprocket wheel 42 is secured to a shaft 44 which is journalled for rotation in bearings formed in side members 46 and 47. The side members are provided with a plurality of openings 48 for accommodating the shaft 44 in a number of positions. The sprocket wheel 43 is mounted for rotation on a shaft 51. This shaft extends through horizontally disposed slots 52 in the side members 46 and 47. The shaft 51 carries a pair of collars 53 secured to the shaft to prevent axial movement of the sprocket wheel 43 on the shaft. The ends of the shaft 51 are flattened as shown in Fig. 6 in the portions which extend through the slots 52. A pair of elongated screws 54 extend through threaded openings in the shaft 51. The heads of the screws 54 engage angle brackets 56 rigidly secured to the side members 46 and 47 as shown in Fig. 6. The screws serve to shift the shaft 51 to the right in Fig. 4 to adjust the tension of the sprocket chain 37. Any one of the axial aligned holes 48 may be utilized for the shaft 44. Such adjustment of the position of the sprocket wheel 43 makes it possible for the tensioning mechanism to adequately maintain the sprocket chain in a taut condition around the sprocket wheels 42 and 43. A top plate 57 is carried by the side members 46 and 47 and secured thereto by means of screws 58 (Fig. 4). The sprocket chain 37 in its upper course of movement between the sprocket wheels passes above the plate 57.

The shaft 44 carries an additional and larger sprocket wheel 59 which is secured to the shaft 44 in any suitable manner. A motor 61 is provided for driving the sprocket wheel 59. The motor shaft 62 carries a small sprocket wheel 63. A sprocket chain 64 is trained about the sprockets 59 and 63 and serves to drive the brushes in an endless path. A base platform 66 for the motor is supported on bars 67 secured to the side members 46 and 47 in any suitable manner such as by welding.

The brushes 33 and the driving means therefore including the sprocket wheels are supported as a unit on the frame 23. One arrangement that has been found satisfactory for supporting this unit and permitting adjustments in the angular disposition of the path of the sprocket chain 37 in relation to the direction of movement of the column includes two bars 68 and 69 which are arranged parallel to the length of the column 12. These bars 68 and 69 are supported at their ends by means of bolts 71 which extend through slots in two horizontally disposed frame members one of which is shown at 72 carried by the upright members 26 and 29. The bar 68 extends through slots 74 in the side members 46 and 47 and the bar 69 extends through slots 76 in the side members 46 and 47. The bars 68 and 69 thus serve to support the brush handling and driving unit on the frame 23.

The upright members of the frame 23 are adjusted and fixed in position so that the path described by the tips of the bristles or wires 34 in their lower course of movement is such as to lightly score the upper surfaces of the clumn 12. The clay or shale column moves in the direction of the arrow 77 and it is therefore necessary that the sprocket chain 37 be disposed at an angle differing from a right angle position with reference to the direction of movement of the column 12 in order for the score lines 78 to be at right angles to the length of the column. It is for this purpose that the scoring unit is so mounted on the frame 23 as to permit angular adjustment of the path of the sprocket chain 37 in relation to the direction of movement 77 of the column 12 particularly when it is desired to increase or decrease the speed at which the plastic material issues from the die 11. The scoring unit is shiftable on the bars 68 and 69 and suitable means is provided for adjusting and maintaining the scoring unit in angular positions relative to the column 12.

In the embodiment illustrated a hand wheel 79 is provided for manually shifting the unit which is connected to a pinion 81 by means of a shaft 82. The shaft 82 is journalled in a bearing 83 carried by the upright member 29. A rack gear 84 is slidably supported in a bracket 87 and maintained in mesh with the pinion 81. The rack gear bar 84 is pivotally connected to the member 47 by means of a bolt 86 which extends through a slot 90 in an angle bracket secured to the side member 47. The scoring unit may be pivotally connected to the bar 69 by means of a bolt or the like 88 (Fig. 1). Thus upon rotation of the hand wheel 79 the rack gear bar 84 is shifted to the right or left in Fig. 1 to move the associated end of the scoring unit to the right or left of the position shown in Fig. 1. During such swinging movement the unit turns about the axis of the pivot 88 to thereby adjust the angular position of the scoring device for providing true right angle score lines 78 in the top surface of the column 12 to accommodate any changes in speed through which the plastic material is extruded from the die 11. It is possible to so adjust the path of movement of the sprocket chain 37 to provide score lines having a slightly angular disposition with reference to true right angle positions. The scoring unit may be secured in any adjusted position by means of a nut 91 (Figs. 1 and 9) which may be tightened on the bolt 86.

Figure 10:
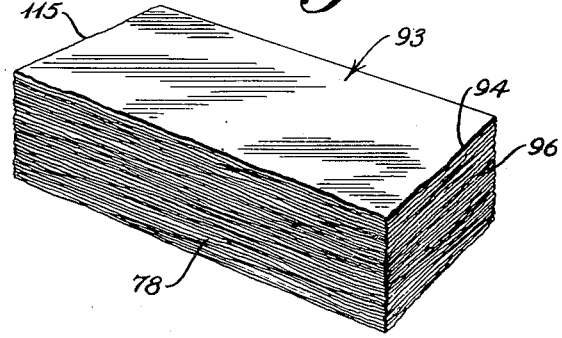
Fig. 10 is a perspective view of a brick cut from the column showing the textured horizontal scoring on the face and one header end.

The invention includes means for applying similar score lines or texture to each side edge of the column 12 so that after the column is cut into a brick as shown at 93 in Fig. 10 the side surface of the column which forms the header end 94 will have score lines 96 extending in a horizontal direction. It is for this purpose that a plurality of brushes 97 similar to those previously described are mounted on an endless sprocket chain 98 trained about sprocket wheels 99 and 103. The sprocket wheel 99 is carried by a shaft 101 journalled in bearings 102. The upper sprocket wheel 103 is mounted for rotation on a shaft 104. The shaft 104 may be moved upwardly with respect to the shaft 101 by means of screws 106 to maintain the sprocket chain 98 taut. A sprocket wheel 108 is secured to the shaft 101 and this sprocket wheel and the shaft 101 are driven by means of a sprocket chain 109 and the motor 111. The frame structure for supporting and driving sprocket chain 98 and the brushes 97 is carried by a bar 112 which extends horizontally along the side of the column 12 and may be supported on the extrusion die 11. The bar 112 extends through slots (not shown) in the side members 105 and 110 of the side scoring unit. A pivot 100 (Fig. 2) connects this unit to the bar 112.

A similar scoring unit is mounted at the other side of the column 12 for applying a textural finish and score lines to the side which forms the other header end 115 of each brick. A plurality of brushes 114 are provided for scoring the opposite side of the column 12 to create these score lines. The brushes 114 are carried by a sprocket chain 116 which is trained about sprocket wheels 118 and 120. The lower sprocket wheel 118 is secured to a shaft 119 while the upper sprocket wheel 120 rotates about a shaft 122. The shaft 122 may be moved upwardly to maintain the sprocket chain 116 taut by means of screws 123. The shaft 119 carries a sprocket pulley 121 which is driven by a sprocket chain 124 and a motor 126. The frame structure for supporting the sprocket shafts 119 and 122 is swingable about a horizontal pivot carried on a bar similar to that shown at 112.

Any suitable mechanism may be provided for shifting the path of movement of the sprocket chain 98 and the path of movement of the sprocket chain 116 in relation to a true vertical plane. In the embodiment illustrated two hand wheels 131 and 132 are mounted on opposite ends of a shaft 133. A pinion gear 136 meshes with a rack gear bar 138 supported by guide brackets 139. The end of the rack gear bar 138 is pivotally connected to the unit which is supported on the pivot 100 by means of a bolt 140. A pinion gear 137 on the shaft 133 is in mesh with a rack gear bar 141 which is supported by a bracket 143. The bar 141 is pivotally connected to the frame supporting the sprocket wheels which guide the sprocket chains 116 by means of a bolt 142. Thus rotation of either hand wheel 131 or 132 will shift the units at the sides of the column 12 to alter the path of the respective groups of brushes and thus provide true vertical score lines at the side edges of the column 12. It is possible to avoid the shaft 133 extending from one side of the machine to the other so that the angle of scoring at each side face of the column may be individually adjusted.

In operation the plastic material is extruded from the die 11 to form the column 12 which moves in the direction of the arrow 77. The column is supported on the plate 14 and the conveyor belt 16 as it is moved away from the brick making machine 10. The motor 61 drives the sprocket chain 64 and the brushes 33 are thus moved in the direction of the arrow 151 in Fig. 3. The bristles 34 of the brushes 33 may be formed of wire so that the end portions lightly engage the top surface and form the score line 78. These textural lines are preferably formed at right angles to the arrow 77 and thus form horizontal score lines in the brick as shown in Fig. 10.

The motors 111 and 126 move the brushes 97 and 114 downwardly along the side edges of the column 12 to provide the textural score lines at the sides of the plastic material. Thus the column as it moves toward the left in Fig. 1 is provided with score lines in the top face and side edges. An idler wheel 146 may be provided for removing any loose particles of the plastic material which may tend to overhang the side edge as a result of the action of the brushes 33. A guide member 150 is provided for preventing lateral shifting of the column 12 as a result of the action of the brushes 33. The column is then cut to form the bricks having the face of the header ends scored as shown in Fig. 10.

While the invention has been described with reference to specific structural features and with regard to one general organization it will be appreciated that changes may be made in the details as well as the overall assembly. Such modifications and others may be made without departing from the spirit and scope of the invention as set forth in the appended claims.

What I claim and desire to secure by Letters Patent is:

1. In apparatus for transversely scoring a surface of a moving plastic column, a pair of side members arranged substantially parallel to each other and disposed transversely of the column adjacent the surface to be scored, a plate joining said side members, a pair of shafts supported by said side members, a sprocket wheel on each shaft, a sprocket chain trained about said sprocket wheels arranged in a plane generally transversely of the direction of movement of the plastic column, a platform carried by ends of said side members, a motor supported on said platform, means providing a driving connection between the motor and one of said sprocket wheels to move the sprocket chain, a plurality of brushes secured to said sprocket chain, bristles on said brushes for engaging the surface of the plastic column to be scored, said side members having aligned slots therein, frame members, a bar carried by said frame members extending through said slots to support the side members so that they may be shifted to vary the angle thereof with respect to the direction of movement of the column, a pivotal connection between said bar and said plate, and means securing the side members in an adjusted angular position relative to the direction of movement of the column.

2. In apparatus for providing transverse scoring of a surface of a moving plastic column, a pair of side members disposed transversely of the column and adjacent the surface thereof to be scored, a pair of shafts supported on said side members, a sprocket wheel on each shaft, a sprocket chain trained about said sprocket wheels arranged in a plane generally transversely of the direction of movement of the plastic column, means driving one of said sprocket wheels to move the sprocket chain, a plurality of brushes secured to said sprocket chain, said brushes having bristles for engaging the surface of the column to be scored, said side members having slots therein, frame members, a bar extending longitudinally of the column through said slots to support the side members so that they may be moved in a plane parallel to the face of the column to be scored, and means securing the side members in the adjusted position.

3. In apparatus for transversely scoring a surface of a moving plastic column, a pair of side members disposed transversely of the column and adjacent the surface thereof to be scored, a plate joining said side members, a pair of shafts supported on said side members, a sprocket wheel on each shaft, a sprocket chain trained about said sprocket wheels arranged in a plane generally transversely of the direction of movement of the plastic column, means for driving one of said sprocket wheels to move the sprocket chain, a plurality of brushes secured to said sprocket chain, bristles on said brushes for engaging the surface of the clay column to be scored, said side members having aligned slots therein, frame members, bars extending longitudinally of the column through said slots to support the side members so that they may be shifted in a plane parallel to the surface to be scored, a pivotal connection between one bar and said plate, and means securing the side members in an adjusted position.

4. In apparatus for scoring a plastic column comprising, an extrusion die through which a generally rectangular formation of plastic material escapes as a column, a conveyor structure supporting the column during movement away from the extrusion die, a scoring unit arranged transversely of one side face of the column and comprising, a pair of shafts supported by said unit, a sprocket wheel on each shaft, a sprocket chain trained about said sprocket wheels arranged in a plane generally transversely of the direction of movement of the column, a plurality of brushes secured to said sprocket chains having bristles for engaging the face of the column to be scored, means carried by the unit for driving one of said sprocket wheels to move the brushes transversely of the column, said scoring unit having slots therein, a bar extending longitudinally of the conveyor through said slots supporting said unit, means maintaining said bar in fixed relationship with the conveyor structure, and said slots having a greater width than the transverse dimensions of the bar so that the unit may be moved angularly with respect to the length of the column.

References Cited in the file of this patent

UNITED STATES PATENTS

| | | |
|---|---|---|
| 1,179,792 | Ballou | Apr. 18, 1916 |
| 1,514,632 | Ruby | Nov. 11, 1924 |
| 1,580,153 | Neher | Apr. 13, 1926 |
| 1,888,376 | Duty | Nov. 22, 1932 |